Jan. 15, 1963
C. O. BRODERS ET AL
3,073,335
AFTERBURNER SHUTOFF VALVE
Filed May 5, 1959
3 Sheets-Sheet 2
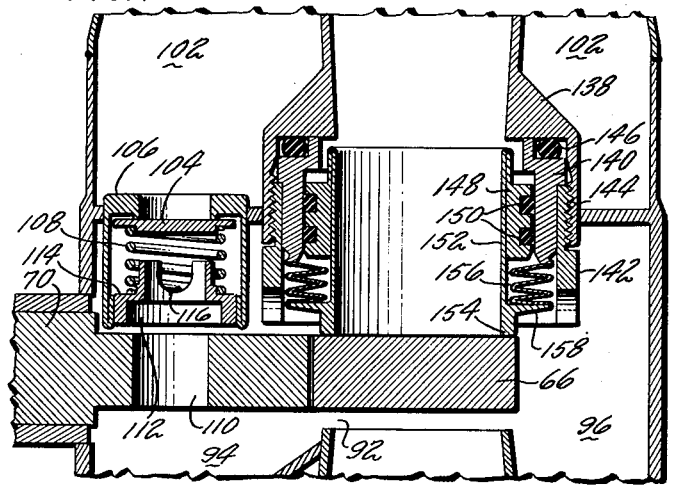
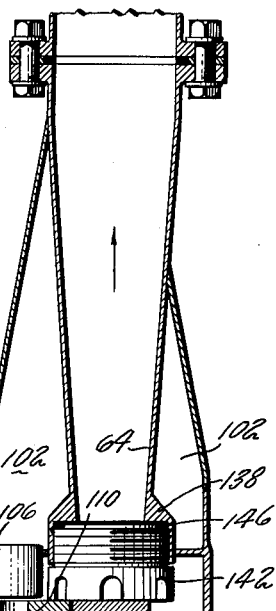
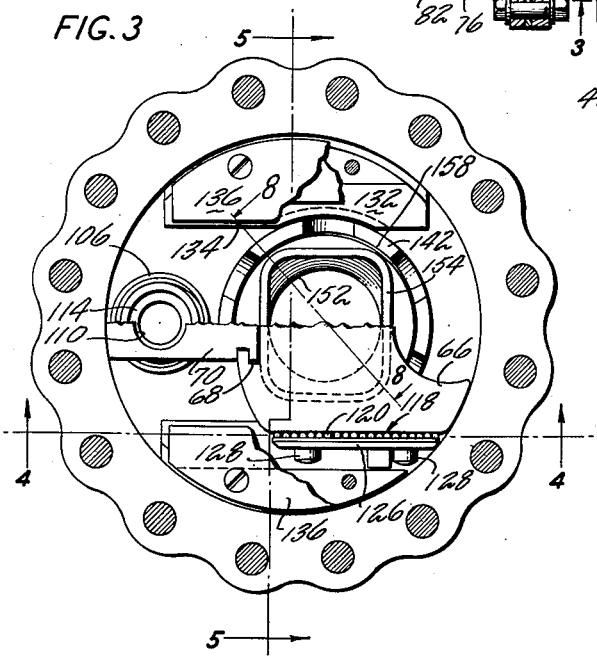
INVENTORS
CLAUDE O. BRODERS
TRENT H. HOLMES
BY
ATTORNEY Jan. 15, 1963   C. O. BRODERS ET AL   3,073,335
AFTERBURNER SHUTOFF VALVE
Filed May 5, 1959   3 Sheets-Sheet 3

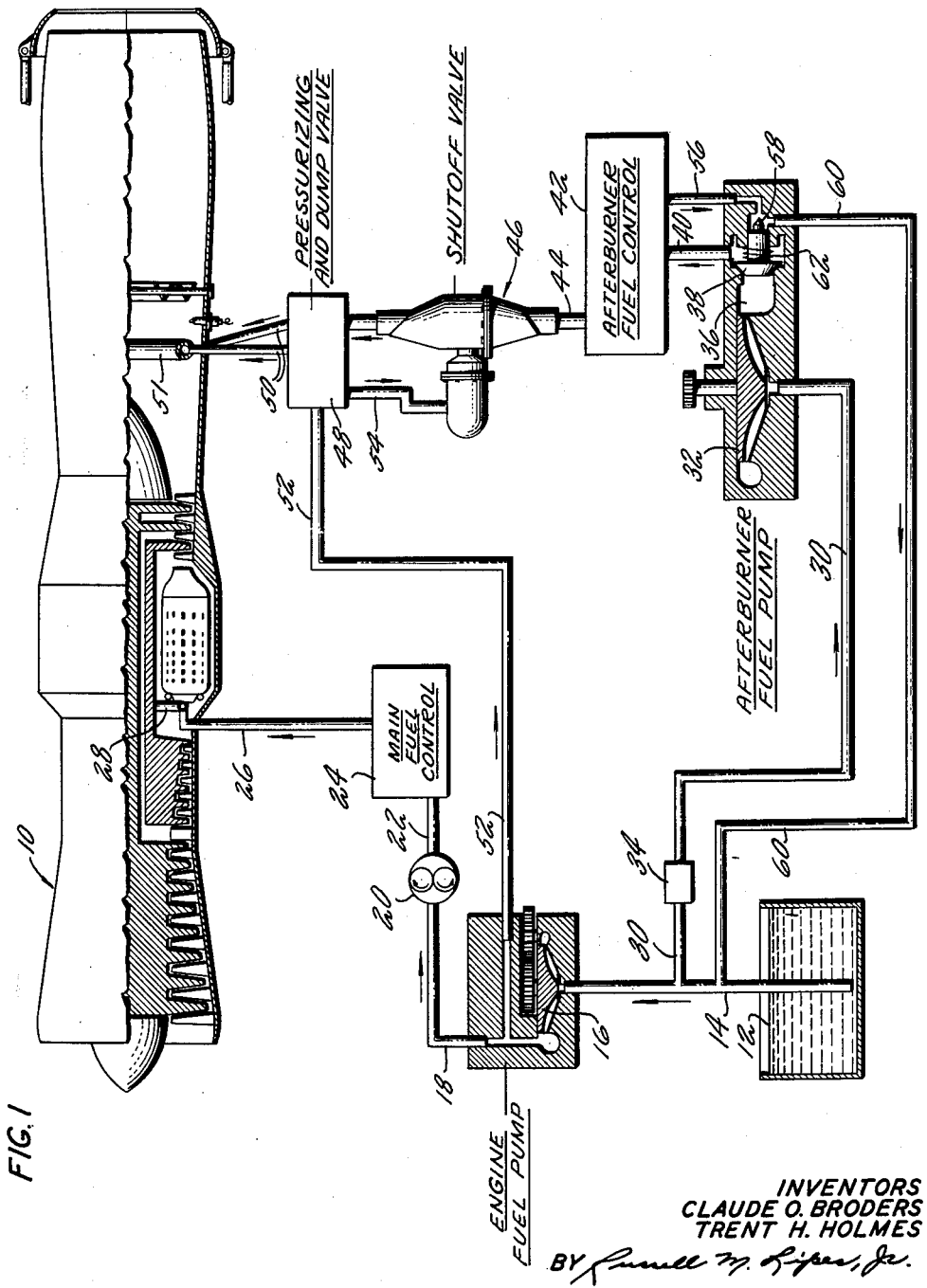

INVENTORS
CLAUDE O. BRODERS
TRENT H. HOLMES
BY
ATTORNEY

United States Patent Office 3,073,335
Patented Jan. 15, 1963

3,073,335
AFTERBURNER SHUTOFF VALVE
Claude O. Broders, Simsbury, and Trent H. Holmes, Rocky Hill, Conn., assignors to United Aircraft Corporation, East Hartford, Conn., a corporation of Delaware
Filed May 5, 1959, Ser. No. 811,197
9 Claims. (Cl. 137—340)

This invention relates to shutoff valves, more particularly to an improved shutoff valve for the afterburner fuel system of a gas turbine engine.

In the design of a shutoff valve for an afterburner fuel system it is of primary importance that leakage through the valve gate be kept at an absolute minimum. This tends to complicate the valve structure and the problem is further intensified by the fact that environmental dimensions require that the valve size be kept as small as possible. Locating the valve gate at a necked-down section of the afterburner fuel line helps to meet the size limitation. Still other important design considerations are that the valve gate should have substantially friction-free operation without the imposition of unbalanced pressure loads thereon and that the valve gate elements should be maintained as cool as possible.

An object of this invention, therefore, is to provide an improved shutoff valve for an afterburner fuel system.

Another object of this invention is to provide an afterburner fuel system shutoff valve which has minimum leakage, substantially friction-free gate operation and a pressure balanced gate seat.

Still another object of this invention is to provide an improved afterburner fuel system shutoff valve of the sliding gate type, the valve having a provision for the reverse flow of a cooling fluid and an arrangement of a ball track and hydraulically balanced seat to reduce gate friction.

Other objects and advantages will be apparent from the following specification and claims, and from the accompanying drawing which illustrates an embodiment of the invention.

In the drawing:

FIG. 1 shows the complete fuel system for an afterburning gas turbine engine having therein the shutoff valve of our invention;

FIG. 2 is an enlarged section view of the shutoff valve of our invention;

FIG. 3 is a partial view looking into the shutoff valve from the upstream direction;

FIG. 7 is an enlargement of the check valve and gate seat portion of FIG. 2.

Figure 4:
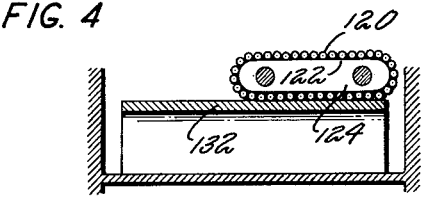
FIG. 4 is a view along lines 4—4 in FIG. 3.

Referring to the drawing in details, in FIG. 1 fuel for the main and afterburner systems for gas turbine engine 10 is supplied from tank 12. Main fuel is withdrawn from the tank through conduit 14 by centrifugal pump 16 and discharged into passage 18 leading to gear pump 20. The gear pump substantially increases the pressure of the main fuel and discharges it into conduit 22 leading to main fuel control 24. From here, metered fuel passes through conduit 26 to ring manifold 28 to be distributed to the various nozzles, not shown, within the burner section of engine 10.

Afterburner fuel is withdrawn from tank 12 through conduit 14 and branch conduit 30 by centrifugal pump 32 when afterburner shutoff valve 34 is opened. The pumped fuel is discharged into chamber 36 containing spring-loaded check valve 38 which will be opened by the pressure of the pumped fuel to admit the fuel to conduit 40 and afterburner fuel control 42. From here, metered afterburner fuel passes through conduit 44, shutoff valve 46 of our invention, pressurizing and dump valve 48, and primary and secondary conduits 50 to ring manifold 51 within the afterburner of engine 10.

In order to cool various elements of the afterburner fuel system when the afterburner is not operating, engine fuel pump interstage fuel is circulated through the elements to be cooled. Conduit 52 is connected to passage 18 between pumps 16 and 20 and through it interstage fuel is directed to pressurizing and dump valve 48 for cooling purposes. The cooling fuel flows from the pressurizing and dump valve through conduit 54 to shutoff valve 46. Within the shutoff valve the cooling fuel is introduced into conduit 44, as will be explained below, and it then flows back through the conduit, afterburner fuel control 42, and conduit 56 to needle valve 58 which is integral with check valve 38. When the needle valve is open, cooling fuel flows through conduit 60 to conduit 14 and the inlet to centrifugal pump 16.

Check valve 38 and needle valve 58 function in a coordinated manner. When shutoff valve 34 is closed and the afterburner is not operating, spring 62 loads the check valve closed and the needle valve open, thus permitting the circulation of cooling fuel flow through the afterburner fuel system. However, when shutoff valve 34 is opened and afterburner fuel starts flowing through the system, the pressure of the fuel in chamber 36 acting on check valve 38 will overcome the loading of spring 62 to open the check valve and close needle valve 58. Of course, cooling flow through the afterburner fuel system elements is not needed when the afterburner is operating and the closing of the needle valve prevents afterburner fuel from being recirculated through conduit 60 back to conduit 14.

FIG. 2 shows the details of shutoff valve 46. Conduit 44 assumes the shape of venturi 64 within the valve and sliding gate 66 is located at the throat of the venturi for controlling fuel flow to the engine afterburner. The sliding gate is of flat form and it is connected by articulated joint 68, FIG. 3, to piston 70 which slides within sleeve 72. The sleeve is integral with base housing 74.

Recess 76 is formed in one end of piston 70 for receiving stem 78, part of the structure for transmitting a spring loading to gate 66. Ball 80 is formed on the end of stem 78 and fits within a socket in recess 76. The remainder of the load transmitting structure includes guide 82 and spring 84 which is mounted between flange 86 on one end of the guide and abutment 88 within cap 90. The spring will act through flange 86, guide 82, stem 78, ball 80, and piston 70 to maintain sliding gate 66 in a closed position in the absence of a dominating opposite load on the gate. The ball and socket connection compensates for any off-squareness error in the spring and the force transmission through the center of the piston tends to prevent rocking and tendency of the piston to bind when sliding in sleeve 72.

When fuel is admitted to the afterburner system, flow beyond gate 66 to the afterburner initially is prevented by the gate. However, the fuel in conduit 44 flows through opening 92 defined between the wall of venturi 64 and the gate into chamber 94 to the left of the venturi as well as into chamber 96 to the right of the venturi. The pressure of the fluid acts to the left upon an effective area equal to that of a section of piston 70 and as the pressure of the fuel increases, the leftward force on the piston becomes sufficiently great to overcome the loading to the right on the piston and move the gate in an opening direction. Fuel then will flow to the afterburner, variation of the gate position regulating the pressure upstream of the valve to at least a minmum differential above the reference pressure in chamber 98 within cap 90. When the flow of fuel through the afterburner system is cut off, the leftward force on the piston will be reduced so that the rightward forces on the piston can close the gate.

Fuel from pump interstage is admitted to chamber 98 through conduit 54 and acts together with spring 84 to load piston 70 to the right. One or more tubes 100 connect the interior of chamber 98 to annular chamber 102 surrounding venturi 64 immediately downstream of the gate. When the afterburner system is flowing fuel, cooling fuel is dead-ended in annular chamber 102 by valve 104, FIG. 7, but when the afterburner system is inactive cooling flow passes through the valve and into conduit 44 to circulate through the system back to the inlet for pump 16.

Valve 104 is spring-loaded against seat 106 by spring 108. When afterburner fuel is admitted to conduit 44, the fuel flows through opening 92 and hole 110 in piston 70 to chamber 112 to act in combination with spring 108 and position valve 104 against seat 106. When afterburner fuel flow is stopped, the pressure of the cooling fuel in annular chamber 102 will overcome the load of spring 108 and open the valve. In its open position valve 104 is positioned against retainer 114 which is provided with a plurality of indentations 116 to permit the flow of cooling fuel past the valve and retainer. The cooling fuel flows through hole 110 and enters conduit 44 through opening 92. The cooling flow then is circulated through needle valve 58 back to the inlet for pump 16 as has been described above.

Figure 5:
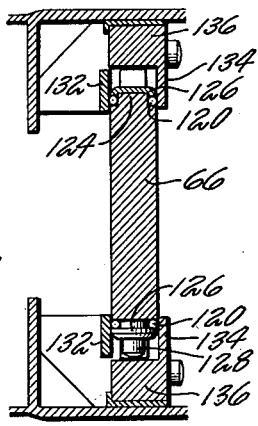
FIG. 5 is a view along lines 5—5 in FIG. 3.
Figure 6:
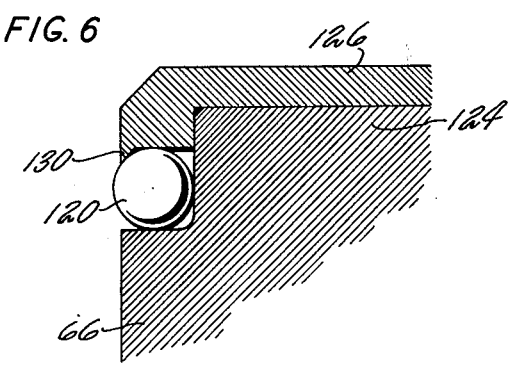
FIG. 6 is an enlargement of a portion of FIG. 5.

Sliding gate 66 is provided along its vertical edges with ball bearings so that movement of the gate can be accomplished with a minimum of friction. One of the ball bearing units is shown at 118 in FIG. 3, and in the end view of FIG. 4 the arrangement of balls 120 and oval-shaped track 122 can be seen. As shown in FIGS. 5 and 6, the edges of gate 66 are machined away leaving projections 124 which define the inner race for track 122. Oval-shaped ball retainer 126 is secured to gate 66 by screws 128, the retainer having lip 130 (FIG. 6) formed about its periphery to retain balls 120 in their track. Two sizes of balls are used, the larger diameter balls being the load carrying balls and the smaller diameter balls acting as spacers to prevent climbing of the load carrying balls. The difference in diameter between the two sizes is in the order of only a few thousandths of an inch.

When gate 66 is being moved, the pressure of the afterburner fuel in conduit 44 loads the gate in the downstream direction. At this time balls 120 roll along track 132 on the downstream side of the gate. When the loading on the gate is in the opposite direction, the balls will roll along flange 134 on guide 136.

A hydraulically balanced seat is provided for sliding gate 66, the seat combining with the ball bearing arrangement above-described, so that friction on the gate will be at a minimum value. Bell-mouthed retainer 138 is formed on the wall of venturi 64 just downstream of gate 66. Guide 140 fits within the retainer and is secured in place by castellated locking ring 142 which is threaded to the retainer by threads 144. O-ring seal 146 is located between the retainer and the guide. Ring carrier 148 is mounted within guide 140 and is grooved to receive a plurality of sealing rings 150. Sleeve 152 has a circular section closely fitting within carrier 148 and a rectangular section 154 (FIG. 3) immediately adjacent the downstream face of gate 66 in the plane of contact with the gate. The sleeve is welded to the carrier at the downstream ends of the elements. Bellows 156 is located around a portion of sleeve 152 and is welded to flange 158 on the sleeve and the upstream end of guide 140. Rings 150 provide a seal between carrier 148 and guide 140 and limit the leakage of fuel into the conduit downstream of the gate in the event of failure of bellows 156.

Figure 8:
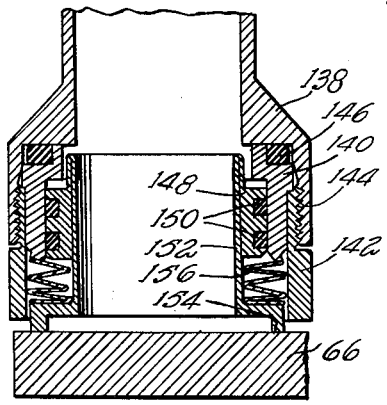
FIG. 8 is a view of the check valve and gate seal along lines 8—8 of FIG. 3.

As should be obvious from the construction of the seat, sleeve 152 and carrier 148 are free to slide axially of the seat, bellows 156 sealing the interior of the seat from fluid upstream of the gate. This freedom of axial movement allows for realignment or readjustment of the seat if the valve or seat should become worn, or if a foreign substance should become lodged between the seat and the valve. In either of these events, the seat will move to assure that the friction force between the seat and the valve remains at an essentially constant value determined by the bellows spring load. The effective area of rectangular section 154 is equal to the effective area of bellows 156 with the result that the seat is hydraulically balanced. It will be observed that the exact location of the effective area of the bellows is not crucial. The important consideration is that the effective area of the bellows is designed to match the area of rectangular section 154. Referring to FIGS. 7 and 8, it can be seen that, because of the rectangular nature of section 154, the point of contact between section 154 and gate 66 moves outwardly and overlaps bellows 156 and flange 158 as the diagonals of section 154 are approached. Referring to FIG. 8, it can be seen that the exposure of flange 158 to pressurized fluid decreases and is eliminated as the diagonals of section 154 are approached. Also, the final convolution of bellows 156 is grounded to guide 140 at a point short of the outer diameter of the convolution so that the pressurized fluid only acts over a portion of the area of the final convolution. These last two facts cooperate to produce a hydraulically balanced valve seat which is insensitive to changes in pressure of the fluid in the valve. Section 154 is rectangular rather than circular to keep the required travel for piston 70 and gate 66 as small as possible. As shown, the travel required to fully open gate 66 is substantially less than it would be if section 154 were circular and of the size of the bellows effective area, and thus, the envelope for the shutoff valve can be kept as small as possible. The only axial loading on gate 66, aside from that of the upstream fluid pressure, is that of the bellows spring load. The fluid pressure loading is taken by balls 120 which afford little resistance to motion of the gate. The bellows spring load on the gate is relatively small, also affording little resistance to motion of the gate.

It is to be understood that the invention is not limited to the specific embodiment herein illustrated and described, but may be used in other ways without departure from its spirit as defined by the following claims.

We claim:

1. In a fluid supply system, a supply conduit, a shutoff valve in said conduit, said valve including a sliding gate mounted in said conduit, a supply of cooling fluid, means automatically circulating the cooling fluid through said conduit when said gate is closed and shutting off the flow of cooling fluid when said gate is open, and means for providing relatively friction-free sliding of said gate, said latter means including an antifriction bearing mounting and a hydraulically balanced seat for said gate.

2. In a fluid supply system, a supply conduit, a shutoff valve in said conduit, said valve including a sliding gate mounted in said conduit, pressure responsive means for opening and closing said gate, a supply of cooling fluid, means automatically circulating the cooling fluid through said conduit when said gate is closed and shutting off the flow of cooling fluid when said gate is open, and means for providing relatively friction-free sliding of said gate, said latter means including an antifriction bearing mounting and a hydraulically balanced seat for said gate.

3. In a fluid supply system, a supply conduit, a shutoff valve in said conduit, said valve including a sliding gate mounted in said conduit, pressure responsive means for opening and closing said gate, means for admitting a cooling fluid to said valve, check valve means in said admitting means for controlling the circulation of said cooling fluid through said conduit, and an antifriction bearing mounting and a hydraulically balanced seat for said gate to provide relatively friction-free sliding of said gate.

4. In a fluid supply system, a supply conduit, a shutoff valve in said conduit, said valve including a sliding gate controlling flow therethrough, a continuous ball bearing track arrangement for guiding sliding movement of said gate, said arrangement including balls in grooves in said gate, and a hydraulically balanced seat for said gate.

5. In a fluid supply system, a supply conduit, a shutoff valve in said conduit, said valve including a sliding gate controlling flow therethrough, a ball bearing mounting arrangement for said gate, and a hydraulically balanced seat for said gate, said seat including a movable sleeve and bellows means connecting said sleeve to a fixed retainer, said sleeve contacting said gate to form said seat and having an effective area in the plane of contact equal to the effective area of said bellows means.

6. In a fluid supply system, a supply conduit, a shutoff valve in said conduit, said valve including a sliding gate controlling flow therethrough, a ball bearing mounting arrangement for said gate, and a hydraulically balanced seat for said gate, said seat including a movable sleeve and bellows means connecting said sleeve to a fixed retainer, one end of said sleeve contacting said gate and being of rectangular section in the plane of contact, the effective area of said rectangular section being equal to the effective area of said bellows.

7. In a fluid supply system, a supply conduit, a shutoff valve in said conduit, said valve including a venturi defining the flow conduit through the valve and a sliding gate mounted at the throat of the venturi, antifriction mounting means for said gate, and a hydraulically balanced seat for said gate, said seat including a movable sleeve connected by bellows means to a fixed retainer, one end of said sleeve contacting said gate and being of rectangular section at the area of contact, the effective area of said rectangular section being equal to the effective area of said bellows.

8. In a fluid supply system, a supply conduit, a shutoff valve in said conduit, said valve including a venturi defining the flow conduit through the valve and a sliding gate mounted at the throat of the venturi, piston means operatively connected with said gate, means for loading said piston in opposite directions to open and close said gate, means for admitting a cooling fluid to said valve, check valve means controlling the circulation of said cooling fluid through said valve, a ball bearing mounting for guiding said gate in opening and closing motion, alternate balls in said arrangement being of different diameter, and a seat for said gate including a slideable sleeve connected by a bellows to a fixed retainer, one end of said sleeve contacting said gate and being of rectangular section in the plane of contact, the effective area of said rectangular section being equal to the effective area of said bellows to hydraulically balance said seat.

9. A fluid supply system as in claim 1 wherein the means for circulating and shutting off the cooling flow includes means responsive to the pressure in said conduit.

References Cited in the file of this patent
UNITED STATES PATENTS

| | | |
|---|---|---|
| 327,117 | Strebel | Sept. 29, 1885 |
| 701,944 | Saltar | June 10, 1902 |
| 898,945 | Weibel-Mulish | Sept. 15, 1908 |
| 935,709 | Turner | Oct. 5, 1909 |
| 1,209,673 | Coggin | Dec. 26, 1916 |
| 1,439,720 | Yarnall | Dec. 26, 1922 |
| 1,631,481 | Gfeller | June 7, 1927 |
| 1,823,394 | Geiger | Sept. 15, 1931 |
| 2,063,655 | Barner | Dec. 8, 1936 |
| 2,221,724 | Safford | Nov. 12, 1940 |
| 2,331,465 | Fox | Oct. 12, 1943 |
| 2,548,128 | Snyder | Apr. 10, 1951 |
| 2,569,857 | Jaegle | Oct. 2, 1951 |
| 2,796,230 | Grove | June 18, 1957 |
| 2,899,798 | Broders | Aug. 18, 1959 |